G. W. STEIN.
COMBINED VENTILATOR AND SCREEN.
APPLICATION FILED DEC. 27, 1918.
1,331,397.
Patented Feb. 17, 1920.
2 SHEETS—SHEET 1.
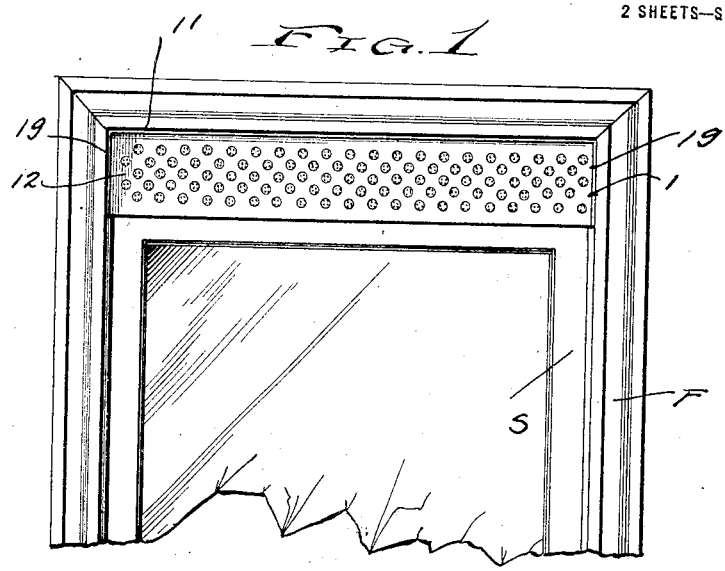
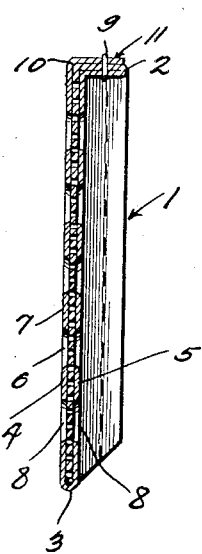
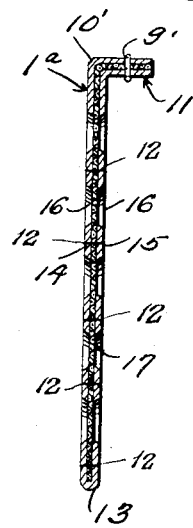
Inventor
George W. Stein G. W. STEIN.
COMBINED VENTILATOR AND SCREEN.
APPLICATION FILED DEC. 27, 1918.
1,331,397.
Patented Feb. 17, 1920.
2 SHEETS—SHEET 2.
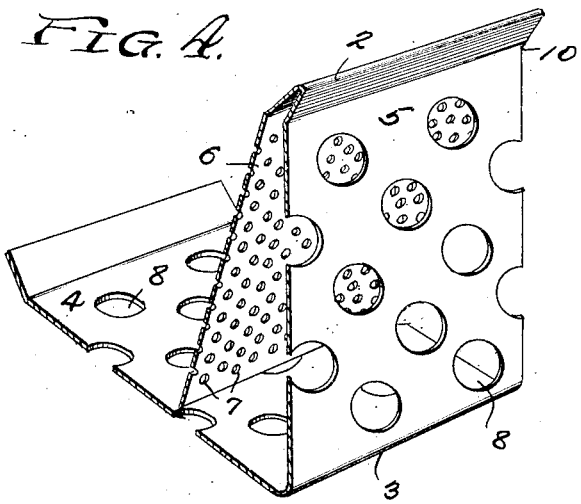
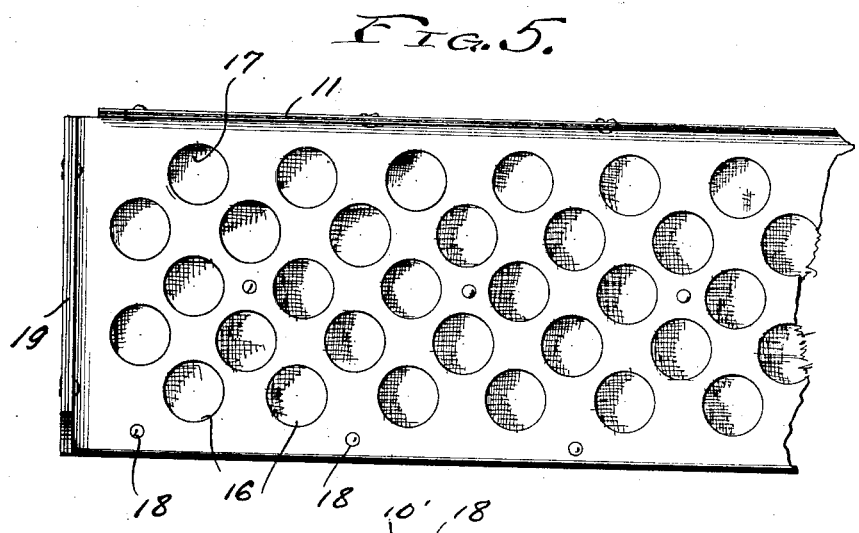
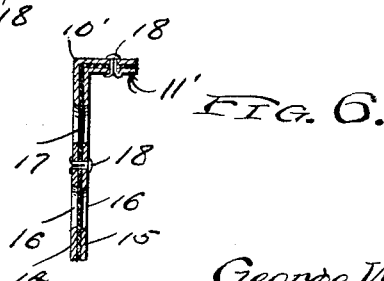
George W. Stein, Inventor
By Richard Beaven, Attorney

UNITED STATES PATENT OFFICE.

GEORGE W. STEIN, OF CHICAGO, ILLINOIS.

COMBINED VENTILATOR AND SCREEN.

1,331,397.  Specification of Letters Patent.  Patented Feb. 17, 1920.

Application filed December 27, 1918. Serial No. 268,455.

*To all whom it may concern:*

Be it known that I, GEORGE W. STEIN, a citizen of the United States, residing at Chicago, in the county of Cook and State of Illinois, have invented certain new and useful Improvements in Combined Ventilators and Screens, of which the following is a specification.

This invention relates to ventilators for windows and other openings.

The object of the invention is to provide a combined ventilator and screen which is rustproof, simple, cheap and practical.

Another object is to so construct a ventilator that it will not break or mar the windows in connection with which it is used and which may be bought in strips and easily cut to fit any width window.

Another object is to provide a ventilator which may be used at the top, center or bottom of a window and perform the double function of a ventilator and screen for flies, other insects and dust.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a front elevation of the upper portion of a window equipped with one form of this invention, Fig. 2 is a vertical transverse section through the ventilator, Fig. 3 is a similar view showing a slightly different form of the invention, Fig. 4 is a detail perspective view of the ventilator shown in Figs. 1 and 2 with the parts arranged in partially folded position, Fig. 5 is an enlarged front elevation of a portion of a ventilator showing a slight modification of the invention, and Fig. 6 is a detail transverse sectional view of the form shown in Fig. 5.

In the embodiment illustrated in Figs. 1, 2 and 4, a ventilator 1 is shown composed of a sheet of cardboard folded longitudinally at 2 and 3 equal distances apart to form sections 4, 5 and 6, the section 5 being arranged between the folds 2 and 3, while section 6 is adapted to be positioned between sections 4 and 5 as is shown clearly in Fig. 2. The middle or intermediate section 6 is provided with a plurality of closely arranged perforations 7, while the outer sections 4 and 5 have large apertures 8 which may be of any desired configuration, but are here shown circular. These apertures 8 in sections 4 and 5 are so positioned that when the sections are in folded operative position they will be arranged opposite each other with the perforated section 6 between them so that air may circulate through the perforations and apertures without admitting dust or insects into the room in connection with which the device is used.

When the sections 4, 5 and 6 have been folded in close contact with each other they are stitched along one edge as shown at 9 and are creased or folded along the line 10 after being so connected. This fold forms a flange 11 which is designed to engage the window frame so as to exclude all particles of dust which might otherwise enter and which insures a close fit of the ventilator in the frame. The sections 4, 5 and 6 after being so folded are also preferably stitched through as shown at 12 to securely hold the sections together and form a rigid non-yieldable screen.

The cardboard of which this combined screen and ventilator is composed is rendered waterproof, preferably by enameling it on one or both faces and this enamel may be of any desired color to correspond with the shades in the room in connection with which the ventilators are to be used, or they may be colored to correspond with the woodwork at the option of the purchaser, also assists in rendering the screen sufficiently rigid to withstand all strains to which it will be subjected. It is to be understood that large supplies of this material are kept on hand to be sold in strips.

In the form shown in Fig. 3, the ventilator 1ª is composed of a strip of cardboard folded at 13 to compose two outer sections 14 and 15 having registering apertures 16 therein. These apertures 16 are similar to the apertures 8 used in the other form. The free ends of the sections 14 and 15 are stitched together as shown at 9' and folded at 10' to form an attaching or bearing flange 11'. Clamped between the sections 14 and 15 is an intermediate section 17 composed of non-rustable foraminous material preferably of textile fabric, which acts as a strainer to prevent the passage of dust through the registering apertures 16 and yet permit the free circulation of air therethrough. Any desired color may be used for this straining fabric, either to correspond with or contrast with the colors used on the outer sections 14 and 15. These ventilators 1ª are used in the same manner that those shown in Figs. 1, 2 and 4 are employed and are preferably manufactured in long strips or rolls and cut off in lengths to suit the purchaser.

In the form shown in Figs. 5 and 6, the structure is the same as that shown in Fig. 3, except that rivets 18 of copper or non-rustable material are used, for securing the sections together as is shown clearly in Fig. 6.

While I have mentioned cardboard as the material from which these ventilators are to be constructed, it is obvious that this term is intended to cover heavy thick paper, which when coated with enamel will have sufficient rigidity to resist all strains to which it will be subjected and it is also obvious that while stitching and rivets are shown for securing the sections together, it is obvious that they may be otherwise suitably secured if found desirable.

From the above description it will be obvious that ventilators and screens constructed as described and shown will be very cheap to manufacture and very efficient in operation, since they will not mar or injure either the window sash or frame in connection with which they are used, being rustproof and that they may be readily cut by scissors or a knife into desired lengths, to fit windows of different widths and when so cut, flanges 19 may be formed at the opposite ends of the strips cut off for engagement with the side members of the window frame F in connection with which they are to be used.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A device of the class described comprising a sheet of cardboard folded longitudinally to form sections of uniform width and provided with registering apertures, and a foraminous member secured between said sections.

2. A device of the class described comprising a sheet of cardboard folded longitudinally to form sections of uniform width and provided with registering apertures, and a rustproof air penetrable insect excluder secured between said sections.

3. A device of the class described comprising a sheet of cardboard folded longitudinally at a plurality of points to form sections of uniform width arranged in lapping relation and provided with registering apertures, and a rust-proof, air-penetrable, insect excluder secured between said sections.

In testimony whereof I affix my signature in presence of two witnesses.

GEORGE W. STEIN.

Witnesses:
THOMAS C. ANGERSTEW,
R. N. WYCKOFF.